United States Patent [19]

Ono

[11] Patent Number: 4,948,170
[45] Date of Patent: Aug. 14, 1990

[54] GUIDE RAIL FOR PASSIVE SEAT BELT SYSTEM AND FABRICATION METHOD THEREOF

[75] Inventor: Katsuyasu Ono, Kanagawa, Japan

[73] Assignee: Nippon Seiko Kabushiki Kaisha, Tokyo, Japan

[21] Appl. No.: 162,516

[22] Filed: Mar. 1, 1988

[30] Foreign Application Priority Data

Mar. 2, 1987 [JP] Japan .................................. 62-45277

[51] Int. Cl.$^5$ .............................................. B60R 21/10
[52] U.S. Cl. ..................................... 280/804; 297/469
[58] Field of Search .............................. 280/802, 804; 16/87.6 R, 87.8, 95 R, 96 R; 49/409

[56] References Cited

U.S. PATENT DOCUMENTS 3,074,356  1/1963  Parker et al. ........................ 16/95 R
4,236,730  12/1980 Suzuki et al. ........................ 280/804
4,401,321  8/1983  Suzuki et al. ........................ 280/804

FOREIGN PATENT DOCUMENTS 138448  8/1982  Japan .
56946  4/1983  Japan .

Primary Examiner—Kenneth R. Rice
Attorney, Agent, or Firm—Wegner & Bretschneider

[57] ABSTRACT

A guide rail for guiding a movable anchor upon driving the movable anchor by a drive member is constructed to a first guide portion for slidably guiding the movable anchor and a second guide portion combined as a unitary member with the first guide portion and adapted to slidably guide the drive member. The first and second portions are formed of discrete members. The second guide portion is made of a material softer than the first guide portion. The first guide portion and second guide portion are formed separately and are then assembled together into the guide rail.

22 Claims, 4 Drawing Sheets

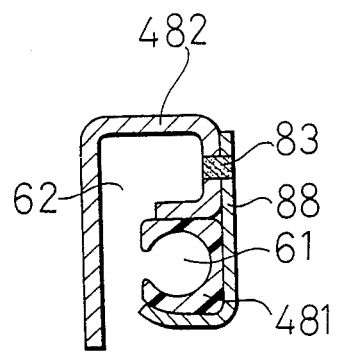
FIG. 6
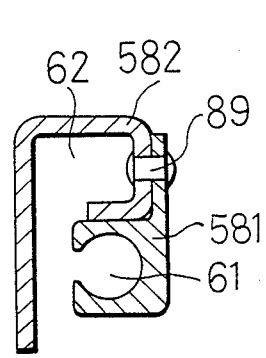
FIG. 7
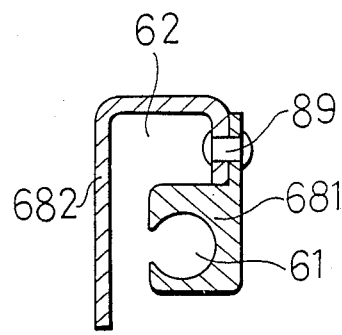
FIG. 8
FIG. 9
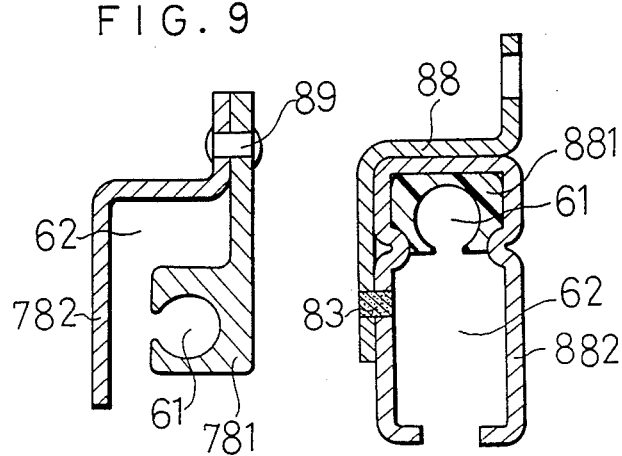
FIG. 10
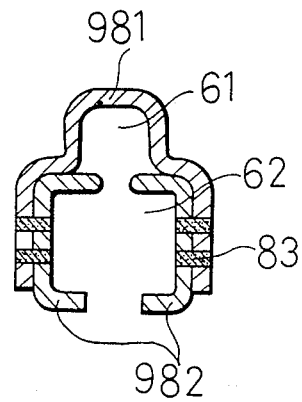
FIG. 11

GUIDE RAIL FOR PASSIVE SEAT BELT SYSTEM AND FABRICATION METHOD THEREOF

BACKGROUND OF THE INVENTION (1) Field of the Invention:

This invention relates to a guide rail for a passive seat belt system which is suitable for use in an automobile. The present invention is also concerned with a fabrication method of the guide rail.

(2) Description of the Related Art:

The use of a seat belt system has become popular in recent years, mainly, due to the mandatory requirement for the use of a seat belt system for an automobile occupant. In order to avoid the rather cumbersome fastening and release of its webbing, there is an increasing demand for passive seat belt systems which permit automatic fastening or release of a webbing in accordance with the opening or closure of an associated door.

In order to facilitate the understanding of the present invention, one example of general passive seat belt systems is described first of all with reference to FIG. 12 which illustrates the overall construction of the exemplary passive seat belt system. Numeral 10 indicates a stationary base of an automobile, while numeral 20 designates a seat. The drawing also shows a webbing 1, a retractor 2 fixed on the seat 20 and adapted to take up or pay out the webbing 1, and an emergency release buckle (hereinafter referred to simply as "buckle") 3 which permits the release of the webbing 1 upon depression of a release button or the like in the event of an emergency. A tongue 21 fastened to the outboard end of the webbing 1 is inserted in the buckle 3. Designated at numeral 4 is a movable anchor which is integral with the buckle 3. The movable anchor 4 travels, together with the buckle 3, through a rail 6 between an anchor base 5 arranged behind the seat 20 and the front end of the rail 6. In order to control the movement of the movable anchor 4, a front end switch 7 and an unillustrated rear end switch are provided at the front end of the rail 6 and within the anchor base 5 respectively. Designated at numeral 22 are brackets by which the rail 6 is mounted on the stationary base 10. Numeral 8 indicates a drive member, such as wire, for driving the movable anchor 4, while numeral 9 designates a drive unit for taking up or pushing out the drive member 8. The operations of the drive member and drive unit are well known in the art and their descriptions are omitted herein.

When the door is opened, the drive member 8 is pushed out from the drive unit 9 so that the movable anchor 4 is guided toward the front of the vehicle along the rail 6. As soon as the movable anchor 4 is brought into contact with the front end switch 7, the switch 7 stops the operation of the drive unit 9. Since the buckle 3 fixed on the movable anchor 4 has been brought to a front part of the stationary base, the webbing 1 is apart frontward from an occupant (not shown) so that the occupant is allowed to get off or get on the automobile easily.

When the occupant then gets on the automobile and closes the door, the drive unit 9 is actuated to take up the drive member 8, whereby the movable anchor 4 is then guided back to the anchor base 5 along the rail 6. Owing to the provision of the unillustrated rear end switch within the anchor base 5 as mentioned above, the operation of the drive unit 9 is stopped upon arrival of the movable anchor 4 at the anchor base 5. As a result, the webbing 1 restrains the body of the occupant as depicted in FIG. 12.

FIG. 13 is a cross-sectional view of the rail 6 taken along line XIII—XIII of FIG. 12, in which there are illustrated a second guide channel 61 for the drive member 8, a first guide channel 62 for the movable anchor 4, a strait portion 63, and an opening 64. FIG. 14 shows by way of example one method for forming a rail stock 6', whose cross-sectional shape is depicted in FIG. 13, into a desired shape. The stock 6' is pressed against a bender 70 by applying forces in directions M,M, whereby the stock 6' is bent and finished into a rail of a three-dimensional complex curvilinear configuration conforming with a corresponding inner wall portion of the stationary base. FIG. 15 is a cross-sectional view taken along line XV—XV of FIG. 14. The bender 70 has side walls 71,73 and central wall 72, so that the rail stock 6' is fittingly received in the bender 70. This structure of the bender 70 is used, because both side walls of the rail stock 6' have to be supported by walls B',C' in order to prevent the rail stock 6' from being deformed in transverse directions indicated by arrows B,C respectively.

As illustrated in FIGS. 13-15, conventional rails are each fabricated by extruding aluminum into the rail stock 6', which defines the opening 64, both guide channels 61,62 and strait 63, and then bending the rail stock 6' three-dimensionally. In view of the function assigned to these conventional rails, they cannot perform as designed unless their transverse cross-sectional configurations are finished with good dimensional accuracy. Their shapes may be deformed unless they are bent by holding or supporting them at portions as many as possible on a bender. Although it is also desirous to support the inner walls of a rail at portions as many as possible on the bender, undercut portions D do not allow the bender to support the rail there. Accordingly, the rail is not supported at the undercut portions D. The undercut portions D therefore cause deformations. For example, the bending may cause a reduction in the width of the channel 61 or 62 at one or more longitudinal sections of the rail.

SUMMARY OF THE INVENTION

With the foregoing in view, the present inventor has carried out an extensive investigation in order to solve the above-mentioned drawbacks of the conventional rails. As a result, it has been found that the above object can be attained by forming the movable anchor guide portion and drive member guide portion of a guide rail as discrete members and then assembling them together into the guide rail.

In one aspect of this invention, there is thus provided a guide rail for guiding a movable anchor upon driving the movable anchor by a drive member. The guide rail comprises a first guide portion for slidably guiding the movable anchor and a second guide portion combined as a unitary member with the first guide portion and adapted to slidably guide the drive member. The first and second portions are formed of discrete members. The second guide portion is made of a material softer than the first guide portion.

In another aspect of this invention, there is also provided a guide rail for guiding a movable anchor upon driving the movable anchor by a drive member. The guide rail comprises a first portion made of a steel sheet and a second portion made of a material softer than the steel sheet and provided as a unitary member with the first portion. A first channel for slidably guiding the movable anchor is formed by both first and second portions. A second channel for slidably guiding the drive member is formed in the second portion.

In a further aspect of this invention, there is also provided a guide rail for guiding a movable anchor upon driving the movable anchor by a drive member. The guide rail comprises a first section made of a steel sheet and a pair of second sections made of steel sheets. The first section has a top wall, a pair of upper side walls extending downwardly substantially at a right angle from both side edges of the top wall respectively, a pair of shoulder walls extending outwardly substantially at a right angle from the lower edges of the upper side walls and a pair of lower side walls extending downwardly substantially at a right angle from both outer side edges of the shoulder walls respectively. The second sections have a substantially square U-shape as viewed in cross-sections thereof and are provided on the corresponding lower side walls of the first section in such a way that the free edges of both side walls of one of the second sections are opposite to the free edges of their corresponding side walls of the other one of the second sections.

In a still further aspect of this invention, there is also provided a method for the fabrication of a guide rail for a passive seat belt system. A movable anchor guide portion for slidably guiding a movable anchor and a drive member guide portion for slidably guiding a drive member are formed separately and then assembled together.

According to the present invention, the movable anchor guide portion requiring high strength and the drive member guide portion requiring configurational accuracy may be formed with different materials respectively. Since the guide rail is formed as sections discrete from one another as viewed in a transverse cross-section thereof, the sections have simpler shapes. Economical stocks preformed from steel sheets may hence be employed instead of costly extruded aluminum stocks. The use of such a steel sheet as a stock allows to fix mounting brackets, which are also made of steel sheets, on the guide rail directly by welding.

BRIEF DESCRIPTION OF THE DRAWINGS

The above and other objects of this invention will become apparent from the following description and the appended claims, taken in conjunction with the accompanying drawings, in which:

FIG. 6 is a transverse cross-section of a guide rail according to a fifth embodiment of this invention;

FIG. 7 is a transverse cross-section of a guide rail according to a six embodiment of this invention;

FIG. 8 is a transverse cross-section of a guide rail according to a seventh embodiment of this invention;

FIG. 9 is a transverse cross-section of a guide rail according to an eighth embodiment of this invention;

FIG. 10 is a transverse cross-section of a guide rail according to a ninth embodiment of this invention;

FIG. 11 is a transverse cross-section of a guide rail according to a tenth embodiment of this invention;

DETAILED DESCRIPTION OF THE INVENTION AND PREFERRED EMBODIMENTS

Figure 13:
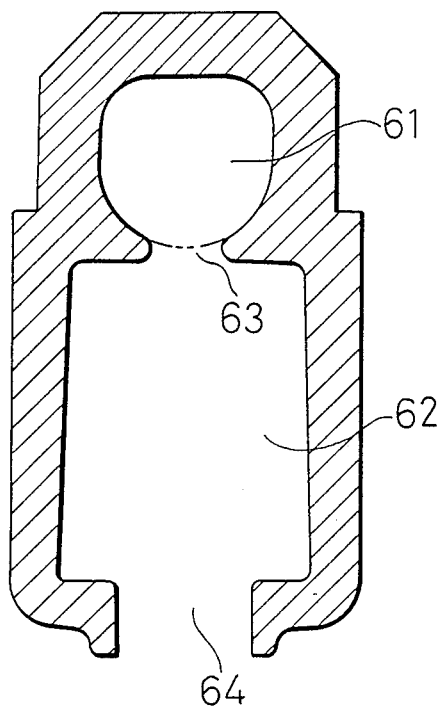
FIG. 13 is a transverse cross-section of a conventional guide rail, taken along line XIII—XIII of FIG. 11.
Figure 15:
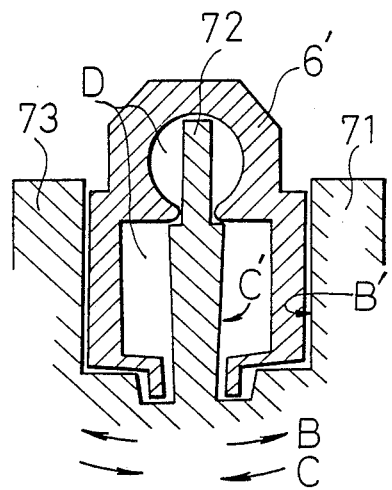
FIG. 15 is a transverse cross-section of the rail stock and bender, taken along line XV—XV of FIG. 14.
Figure 14:
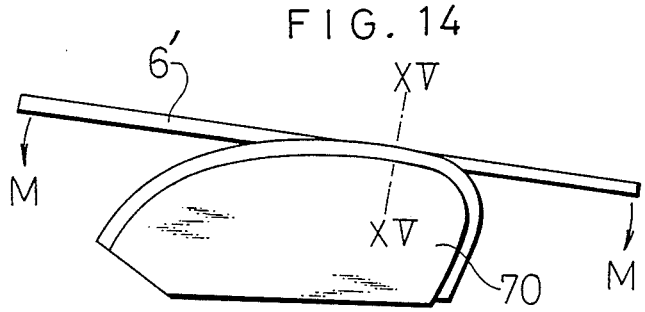
FIG. 14 illustrates a method for pressing a rail stock against a bender.

FIGS. 1 to 11 correspond to FIG. 13 and illustrate guide rails according to the present invention.

Figure 1:
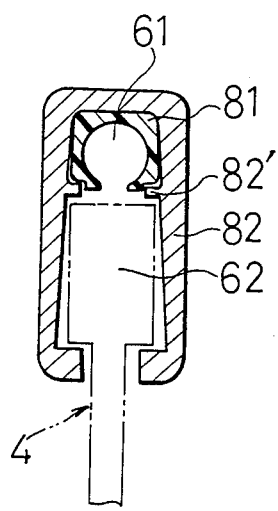
FIG. 1 is a transverse cross-section of a guide rail according to a first embodiment of this invention.

The guide rail according to the first embodiment shown in FIG. 1 is composed of a second member 81 forming the drive member guide channel 61 and a first member 82 forming the movable anchor guide channel 62. The first member 82 is formed of an extruded stock of aluminum or an aluminum alloy (hereinafter simply referred to as "aluminum"), while the second member 81 is formed of a synthetic resin. The movable anchor 4 is indicated by a phantom and is received within the guide channel 62. The first member 82 has shallower undercuts as viewed in its transverse cross-section, compared with conventional rails. After working the first member 82 into a desired bent shape, the second member 81 defining the drive member guide channel 61 is pushed into the thus-bent first member 82. Incidentally, numeral 82' indicates catches for preventing the separation of the second member 81 from the first member 82.

Figure 2:
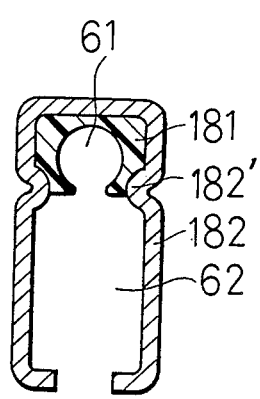
FIG. 2 is a transverse cross-section of a guide rail according to a second embodiment of this invention.

The guide rail according to the second embodiment depicted in FIG. 2 are formed of members 181,182 similar to the members 81,82 in FIG. 1. The member 182 has been formed by roll-forming a steel sheet, while the member 181 has been formed by extrusion-forming a synthetic resin. The members 181 and 182 are combined together. The member 181 may also be formed by extrusion forming of aluminum. The assembly of the members 181 and 182 may be effected after the bending of the member 182 as in the first embodiment depicted in FIG. 1. In the case of a more complex shape, it is difficult to push the member 181 into the member 182. It is hence possible to combine them together while they are still straight and then to bend the thus-combined assembly. The guide rail according to the second embodiment of FIG. 2 does not require the catches 82' of the first embodiment of FIG. 1, since bent portions 182' are provided with the guide rail of the second embodiment. However, the shape of the member 182 is more complex due to the inclusion of the bent portions 182'. Since the member 182 is formed of a steel sheet having better workability than aluminum, its bending work can be accomplished with ease.

Figure 3:
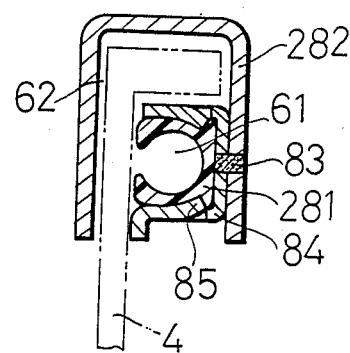
FIG. 3 is a transverse cross-section of a guide rail according to a third embodiment of this invention.
Figure 4:
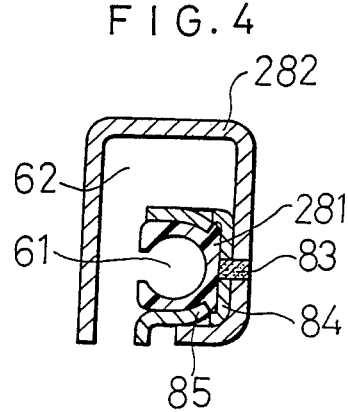
FIG. 4 is a transverse cross-section of a modification of the third embodiment of this invention.

In the third embodiment depicted in FIGS. 3 and 4, members 282 and 84 are formed separately by roll-forming steel sheets. They are united together with a connecting material 83. After their bending, a member 281 made of a synthetic resin and defining the drive member guide channel 61 is pushed into a hollow space defined by the member 84. As an alternative, their bending may be conducted after assembling all the members together. Similarly to the second embodiment, the member 281 may also be formed by extrusion-forming aluminum A projection 85 serves to prevent the separation of the member 281. In FIG. 3, a phantom indicates the movable anchor received within the guide channel 62 which is defined by the member 282.

Figure 5:
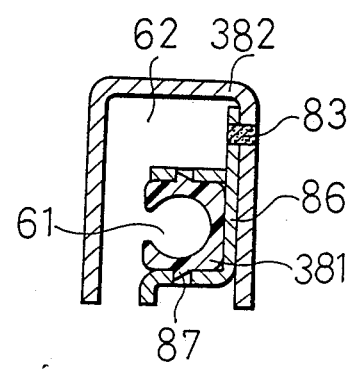
FIG. 5 is a transverse cross-section of a guide rail according to a fourth embodiment of this invention.
Figure 12:
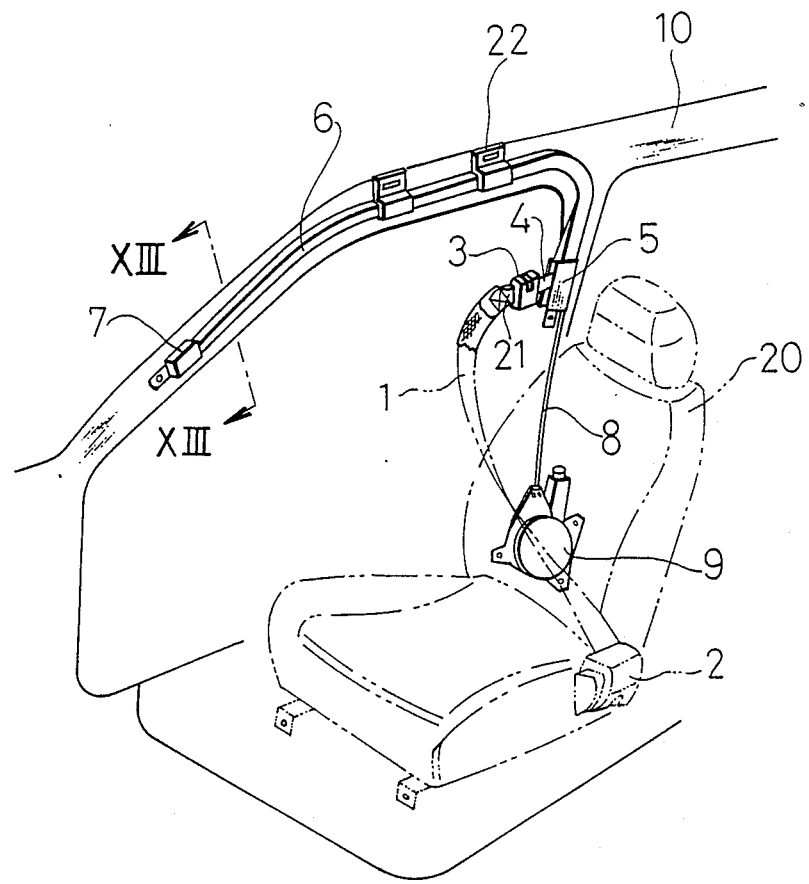
FIG. 12 is a schematic illustration showing the overall construction of an exemplary passive seat belt system.

In the fourth embodiment illustrated in FIG. 5, two members 382,86 which have been obtained by roll-forming steel sheets are separately bent. A member 381 is obtained by extrusion-forming a synthetic resin. After pushing the member 381 into the member 86, the member 86 is fixed on the member 382 by a connecting member 83. The member 381 may be obtained by extrusion-forming aluminum. The connecting member 83 may be formed by a desired method or means, for example, spot-welding, a self-tapping screw, a rivet or the like. Designated at numeral 87 are claws for preventing the separation of the member 381 from the member 86. The claws 87 are fit in grooves 86' formed in corresponding parts of the member 86.

The third and fourth embodiments shown in FIGS. 3–5 allow to reduce or avoid the use of expensive extruded aluminum stocks. Since the fourth embodiment shown in FIG. 5 does not include any undercut, its bending work can be performed easily.

The fifth embodiment of FIG. 6 is composed of a roll-formed member 482 and another member 481 provided outside the member 482. An extruded plastic stock is used as the member 481. The member 481 is fit in a space defined by a bracket 88 and the member 482 while causing the member 481 to undergo an elastic deformation. The bracket 88 has been formed by bending a roll-formed stock. Instead, a plurality of press-formed brackets may be used at desired intervals instead of using the bracket 88 which has substantially the same length as the rail.

In the sixth embodiment shown in FIG. 7, members 581 and 582 are fixed directly to each other by a rivet 89 instead of using a bracket such as the bracket 88 of the fifth embodiment. The member 581 is made of a synthetic resin. It may however be formed by bending an extruded aluminum stock.

In the fifth and sixth embodiments depicted respectively in FIGS. 6 and 7, the members 482,582 defining the movable anchor guide channel 62 and required to have high strength are formed of a steel sheet which provides high strength, while the members 481,581 defining the drive member guide channel 62 and required to have high configurational accuracy are formed of a synthetic resin or soft aluminum having excellent workability. Owing to the selection of these materials, the bending workability has been improved.

In the seventh and eighth embodiments shown respectively in FIGS. 8 and 9, aluminum-made members 681,781 also define the movable anchor guide channel 62 together with their associated members 682,782 formed of a steel sheet. The members 682,782 therefore do not include any undercut, so that the workability has been improved further. Numeral 89 indicates a rivet by which the members 681,781 are fixed on their corresponding members 682,782.

Turning next to the ninth embodiment illustrated in FIG. 10, the bracket 88 is directly fixed at a portion 83 by spot-welding or the like on a member 882 which has been obtained by roll-forming a steel sheet. A member 881 is pushed in the member 882. The bracket 88 is formed of a steel sheet, whereas the member 881 is extrusion-formed from a synthetic resin. It has heretofore been required to pay special attention to the possible separation or positional displacement of mounting brackets until a guide rail is mounted on an automobile. The guide rail of the ninth embodiment does however require such special attention.

In each of the first to ninth embodiments shown respectively in FIG. 1 to FIG. 10, the members 182,282, 382,482,582,682,782,882 make up major parts of the corresponding guide rails and hence serve as rail main bodies. Unlike these preceding embodiments, the guide rail of the tenth embodiment illustrated in FIG. 11 is formed of three sections discrete from one another as viewed in a transverse cross-section thereof. Namely, the shapes of members 981,982 permit easy bending work. After bending these members 981,982 separately, they are welded together by spot welding or the like into the guide rail.

I claim:

1. In a guide rail for guiding a movable anchor upon driving the movable anchor by a drive member, the improvement wherein the guide rail comprises a first guide portion for slidably guiding the movable anchor and a second guide portion combined as a unitary member with the first guide portion and adapted to slidably guide the drive member, the first and second portions are formed of discrete members, and the second guide portion is made of a material softer than the first guide portion;

wherein the first portion comprises a first section made of a steel sheet and a second section made of a steel sheet; the first section is formed in a substantially P-shape as viewed in a transverse cross-section thereof, thereby presenting a longer side wall, a top wall extending substantially at a right angle from one end of the longer side wall, and a shorter side wall extending substantially at a right angle from one end of the top wall, which is distal from the longer side wall, and substantially in parallel with the longer side wall and bent in parallel with the top wall toward the longer side wall; and the second section is formed in a substantially L-shape as viewed in a transverse cross-section thereof, fixed at one of legs thereof on the shorter side wall of the first section and extending at the other leg thereof toward the longer side wall of the first section.

2. In a guide rail for guiding a movable anchor upon driving the movable anchor by a drive member, the improvement wherein the guide rail comprises a first guide portion for slidably guiding the movable anchor and a second guide portion combined as a unitary member with the first guide portion and adapted to slidably guide the drive member, the first and second portions are formed of discrete members, the second guide portion is made of a material softer than the first guide portion, and the second guide portion is provided within the first guide portion.

3. The guide rail as claimed in claim 2, wherein the first guide portion is formed, as viewed in a transverse cross-section thereof, in a substantially square U-shape with both free end portions thereof being bent in directions approaching each other.

4. The guide rail as claimed in claim 2, wherein the first guide portion is provided with a means for preventing the separation of the second guide portion from the first guide portion.

5. The guide rail as claimed in claim 2, wherein the first portion is made of aluminum or an aluminum alloy while the second portion is made of a synthetic resin.

6. The guide rail as claimed in claim 2, wherein the first portion is made of a steel sheet.

7. The guide rail as claimed in claim 6, wherein the second portion is made of aluminum or an aluminum alloy.

8. The guide rail as claimed in claim 6, wherein the second portion is made of a synthetic resin.

9. The guide rail as claimed in claim 6, wherein the first portion is provided with brackets for mounting the guide rail on a stationary base of a vehicle.

10. The guide rail as claimed in claim 9, wherein the brackets are welded to the first portion.

11. In a guide rail for guiding a movable anchor upon driving the movable anchor by a drive member, the improvement wherein the guide rail comprises a first guide portion for slidably guiding the movable anchor and a second guide portion combined as a unitary member with the first guide portion and adapted to slidably guide the drive member, the first and second portions are formed of discrete members, and the second guide portion is made of a material softer than the first guide portion;

wherein the first portion comprises a first part made of a steel sheet and formed in a substantially square U-shape as viewed in a transverse cross-section thereof and a second part made of a steel sheet and formed in a substantially U-shape as viewed in a transverse cross-section thereof, and a top wall connecting both side walls of the second part is fixed on one of side walls of the first part.

12. The guide rail as claimed in claim 11, wherein the second portion is received within the second part.

13. The guide rail as claimed in claim 12, wherein an end portion of said one side wall of the first part is bent toward the other side wall of the first part along the second part.

14. The guide rail as claimed in claim 12, wherein a separation-preventing means is provided between the second part and the second portion.

15. The guide rail as claimed in claim 12, wherein the second portion is received between the first section and the second section.

16. A method for fabrication of a guide rail, comprising:
    forming a first part made out of a steel sheet and having a substantially square U-shape in a cross-section;
    forming a second part made out of a steel sheet and having a substantially square U-shape in cross-section;
    connecting a top wall of said second part to a side wall of the first part so as to form a first guide portion for slidably guiding a movable anchor;
    forming a second guide portion for slidably guiding a drive member out of a material which is softer than steel sheet; and
    attaching the second guide portion and the first guide portion together.

17. The method as claimed in claim 16, wherein said second part comprises means for preventing separation of the first and second guide portions located inside said first part, and wherein said attaching step comprises pressing said second guide portion into engagement with said separation preventing means.

18. In a guide rail for guiding a movable anchor upon driving the movable anchor by a drive member, the improvement wherein the guide rail comprises a first portion made of a steel sheet and a second portion made of a material softer than the steel sheet and provided as a unitary member with the first portion, a first channel for slidably guiding the movable anchor is formed by both first and second portions, and a second channel for slidably guiding the drive member is formed in the second portion.

19. The guide rail as claimed in claim 18, further comprising a means for fixing the second portion on the first portion.

20. In a guide rail for guiding a movable anchor upon driving the movable anchor by a drive member, the improvement wherein the guide rail comprises a first section made of a steel sheet and a pair of second sections made of steel sheets; the first section has a top wall, a pair of side walls extending downwardly substantially at a right angle from both side edges of the top wall respectively; and the second sections have a substantially square U-shape as viewed in cross-sections thereof and are provided on their corresponding lower side walls of the first section in such a way that the free edges of both side walls of one of the second sections are opposite to the free edges of their corresponding side walls of the other one of the second sections.

21. The guide rail as claimed in claim 20, wherein the pair of second sections are welded to the first section.

22. A method for fabrication of a guide rail, comprising:
    forming a first guide portion for slidably guiding a movable anchor out of a first material;
    forming a second guide portion for slidably guiding a drive member out of a second material, said second material being softer than the first guide material; and
    attaching the second guide portion and the first guide portion together;
    wherein said first guide portion is of a substantially square U-shape and comprises means for preventing separation of the first and second guide portions located inside said first guide portion, and wherein said attaching step comprises pressing said second guide portion into engagement with said separation preventing means.

* * * * *